(12) United States Patent
Suzuki et al.

(10) Patent No.: US 7,239,451 B2
(45) Date of Patent: Jul. 3, 2007

(54) PLASTIC OPTICAL COMPONENTS AND AN OPTICAL UNIT USING THE SAME

(75) Inventors: Fumiyuki Suzuki, Tokyo (JP); Noriko Eiha, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/204,012

(22) Filed: Aug. 16, 2005

(65) Prior Publication Data

US 2006/0056035 A1    Mar. 16, 2006

(30) Foreign Application Priority Data

Sep. 2, 2004    (JP)    ............... 2004-255386

(51) Int. Cl.
*G02B 1/00*    (2006.01)
(52) U.S. Cl. .................................... 359/642
(58) Field of Classification Search ................. 359/642
See application file for complete search history.

(56) References Cited

U.S. PATENT DOCUMENTS 5,905,599 A    5/1999    Nomura et al.
6,278,554 B1    8/2001    Aratani et al.
2004/0247901 A1*    12/2004    Suzuki et al. ............... 428/451

FOREIGN PATENT DOCUMENTS

| JP | 11-109107 A | 4/1999 |
| JP | 2000-137166 A | 5/2000 |
| JP | 2002-148402 A | 5/2002 |

* cited by examiner

*Primary Examiner*—Scott J. Sugarman
(74) *Attorney, Agent, or Firm*—Sughrue Mion, PLLC (57) ABSTRACT

The present invention provides a plastic optical component. The plastic optical component has superior characteristics including lightweightness, low cost and suitability for mass production. The plastic optical component exhibits superior moisture barrier quality while experiencing no uneven refractive index profile in their interior even if they are subjected to the effect of water in the environment. The plastic optical component has a moisture-proof coating formed at least on the surfaces in contact with the outside air. During the transient period from the time when the water absorbencies of the surface and central portions of the component began to change on account of an environmental change until the time when they reach the saturated water absorbencies, the difference between the refractive indices of the surface and central portions of the component is no more than 0.0002.

3 Claims, 3 Drawing Sheets

PLASTIC OPTICAL COMPONENTS AND AN OPTICAL UNIT USING THE SAME

FIELD OF THE INVENTION

This invention relates to the technical field of optical components such as lens and prism that are made of plastics, more particularly to plastic optical components that experience extremely small changes in optical performance due to moisture absorption. This invention also relates to an optical unit using such plastic optical components.

Conventionally, camera lenses and a variety of lenses used in finders, copy equipment, printers, projectors and optical communications, as well as optical components including prisms, spectacle lenses, contact lenses and magnifiers are mostly manufactured from glass.

However, with the recent progress in plastic materials and in the plastics molding technology, it has become possible to manufacture lenses, prisms and other optical components at low cost using plastics which are made from cheap materials, lightweight and suitable for mass production.

The problem with plastics is that their optical performance parameters such as refractive index will change upon moisture absorption, so glass is still employed in uses that require high precision (i.e., high resolution) as exemplified by lenses in high-end SLR cameras.

With a view to solving this problem, attempts are being made to develop plastic materials having high moisture barrier quality, namely, low hygroscopicity by various approaches such as designing special polymer structures. However, the cost of such attempts is so high as to sacrifice the economical advantage of plastics themselves.

In order to make optical components of high moisture barrier quality from plastics, it is currently practiced to add hydrophobic substances at a production stage such as molding of an optical component, or cover it with a barrier film impervious to moisture, or provide an anti-reflection film on the optical component and cover its top surface with a coating layer that is subsequently rendered water- and oil-repellant (see JP 2002-148402 A). It is also known to improve the moisture stability of a plastic optical component by forming a hygroscopicity adjusting film only in an area from which a gate has been removed (see JP 11-109107 A). Another approach that is in current practice is fitting an optical system with at least one optical block made of a low-hygroscopicity material to ensure that changes in the performance of the optical system upon moisture absorption are optically compensated (see JP 2000-137166 A).

However, the moisture-proof plastic optical component made by the prior art method just described above and the plastic optical component described in JP 2002-148402 A which has the barrier film and the anti-reflection layer covered with the water- and oil-repellant coating layer are incapable of securing satisfactory moisture barrier quality and hence have had the disadvantage of failing to prevent refractive index and other optical performance parameters from changing upon moisture absorption. According to the technology described in JP 11-109107 A, the hygroscopicity adjusting film is provided only in the area where the gate has been removed but it is substantially difficult to ensure that the rate of moisture absorption from the surrounding areas is held constant and this difficulty, combined with moisture absorption from the surface, has caused such a problem that an optically undesirable or uneven profile of refractive index unavoidably occurs in the interior of the optical component.

A further problem with the technology described in JP 2000-137166 A is that it provides a complex and costly optical system.

SUMMARY OF THE INVENTION

An object, therefore, of the present invention is to solve the aforementioned problems of the prior art by providing plastic optical components which, in addition to the superior characteristics of plastic optical components per se such as lightweightness, low cost and suitability for mass production, exhibit superior moisture barrier quality while experiencing no uneven refractive index profile in their interior even if they are subjected to the effect of water in the environment.

In order to attain the stated object, the present inventors made intensive studies on the changes that would occur to the optical performance of plastic optical components due to moisture absorption. As a result, they found that the changes in the optical performance of plastic optical components due to moisture absorption were mainly attributable to the unevenness in refractive index profile caused by the marked unevenness in the profile of water absorbency that had occurred inside the optical component during the process of moisture absorption or moisture removal. The present invention has been accomplished on the basis of this finding.

In order to attain the above-mentioned object, this invention provides a plastic optical component which has a moisture-proof coating formed at least on the surfaces in contact with the outside air and wherein during the transient period from the time when the water absorbencies of the surface and central portions of the component began to change on account of an environmental change until the time when they reach the saturated water absorbencies, the difference between the refractive indices of the surface and central portions of the component is no more than 0.0002.

Further, this invention provides an optical unit comprising at least two lenses having different Abbe numbers, at least one of which is the plastic optical component of this invention.

Preferably, the optical unit of this invention has an auto-focus mechanism.

According to the present invention, there is offered the advantage of easily realizing-and providing plastic optical components which retain the superior characteristics of plastic optical components per se such as lightweightness, low cost and suitability for mass production and which still exhibit superior moisture barrier quality while experiencing no uneven refractive index profile in their interior even if they are subjected to the effect of water in the environment.

The optical unit of the present invention uses the plastic optical components of the present invention, so even in the face of an environmental change, specifically a change in the humidity of the environment, there will occur no uneven refractive index profile in the interior of a lens and, in addition, the lens itself will only undergo a gradual and uniform change in refractive index. In the case where the lens itself undergoes a uniform change in refractive index and if the change is very small, no greater than what occurs due to moisture absorption, a substantial effect on the optical performance of the lens is no more than a change in its focal position and can be cancelled by using an auto-focus mechanism.

Therefore, according to the present invention, one can produce a superior optical unit whose optical characteristics will not be influenced by environmental changes.

BRIEF DESCRIPTION OF THE DRAWINGS

FIG. 1 shows in concept an embodiment of the plastic optical component of the invention in the form of a lens, wherein

FIG. 4 is for illustrating the shape of an optical component 1' of the present invention which is shown in FIG. 3, wherein

DESCRIPTION OF THE PREFERRED EMBODIMENTS

The plastic optical component of the invention is described below in detail with reference to the preferred embodiments shown in the accompanying drawings.

Figure 1A:
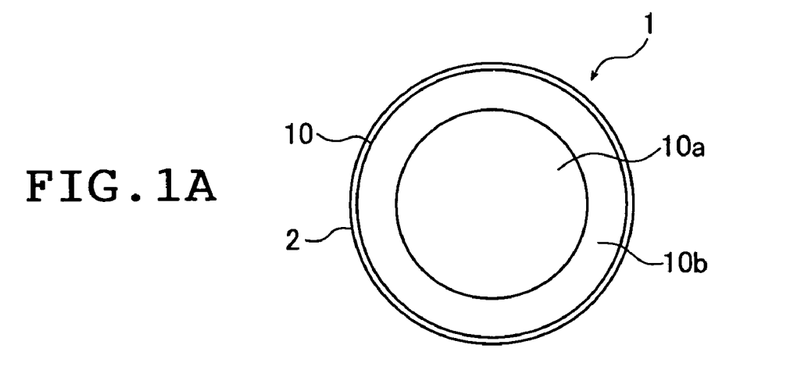
FIG. 1A is a front view of the optical component (as it is seen in a direction parallel to the optical axis) and FIG. 1B is a section of the optical component as cut through a plane including the optical axis.
Figure 1B:
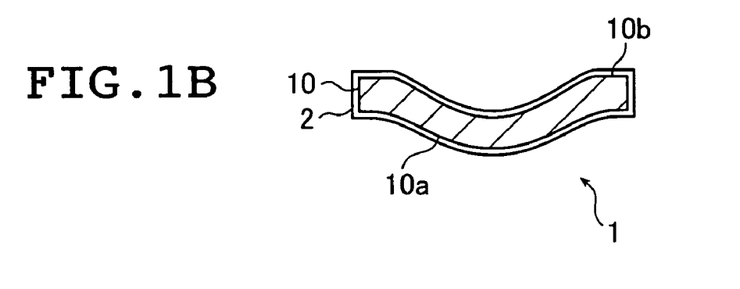

FIGS. 1A and 1B show in concept an embodiment of the plastic optical component of the invention in the form of a lens; FIG. 1A is a front view of the optical component (as it is seen in a direction parallel to the optical axis) and FIG. 1B is a section of the optical component as cut through a plane including the optical axis.

As shown in FIGS. 1A and 1B, the optical component 1 of the invention consists of its plastic body (in this case, a lens) 10 and a moisture-proof coating 2 that is formed at least on the surfaces of the body 10 which are in contact with the outside air. Note that the optical component 1 shown in FIGS. 1A and 1B has the moisture-proof coating 2 formed on all surfaces of its body 10.

Hereinafter, the "body of the optical component" or the "optical component's body" shall refer to a wide range of known optical components including lenses and the "optical component" shall refer to that body of the optical component which has a moisture-proof coating formed at least on its surfaces which are in contact with the outside air.

The optical component's body 10 shown in FIGS. 1A and 1B assumes the shape of a common plastic lens and consists of a lens portion 10a having an optical surface that is surrounded by a flange portion 10b. The optical component 1 shown in FIGS. 1A and 1Ba has a moisture-proof coating 1 formed on all surfaces of the optical component's body 10 including the lens portion 10a and the flange portion 10b.

The optical component 1 of the present invention has the moisture-proof coating 2 formed at least on the surfaces of the body 10 which are in contact with the outside air, so it is characterized in that the unevenness in the profile of water absorbency inside the body 10 and the resulting unevenness in refractive index profile are extremely small even if it is in the process of moisture absorption or moisture removal.

Plastics such as methacrylic resins (e.g. PMMA) and polycarbonate resins that are commonly used in optical components are more hygroscopic than glass. As a result, the bodies of plastic optical components undergo changes in water absorbency due to an environmental change, namely, a change in the humidity of the environment. This change in water absorbency will cause adverse effects on the optical performance of the body of the optical component.

This point will be described below in a more specific manner.

When the body of a plastic optical component is moved from a dry condition to an environment where water vapor is present, the body starts to absorb moisture and its water absorbency begins to change. The water absorbency of the optical component's body increases in response to an environmental change, more specifically with an increase in the humidity of the environment, until an equilibrium is attained at a certain point in time, namely, at the time when it reaches the saturated water absorbency which is determined by the material the optical component's body is made of.

The change in the water absorbency of the optical component's body is not uniform throughout but varies from site to site, for example, between the surface and center portions of it. As the result, the interior of the optical component's body has an uneven profile of water absorbency. And this uneven profile of water absorbency will cause an uneven profile of refractive index in the interior of the optical component's body.

The optical component of the present invention has a moisture-proof coating formed at least on the surfaces of its body which are in contact with the outside air, so it is characterized in that that during the transient period from the time when the water absorbencies of the surface and central portions of the body began to change on account of an environmental change until the time when they reach the saturated water absorbencies, the difference between the refractive indices of the surface and central portions of the body (which is hereunder referred to simply as the "differential refractive index during the transient period") is no more than 0.0002.

Depending on its shape, the surface and central portions of the optical component's body may be respectively defined as follows.

Surface portion: That portion of the optical component's body which, relative to its thickness, assumes up to 20%, preferably 5-10%, as measured from its surface. The "thickness of the optical component's body" as used herein means the thickness in the optical direction of the optical component, namely, in a direction normal to and inward from the optical surface.

Central portion: That portion of the optical component's body which, relative to its thickness, assumes up to 20%, preferably 5-10%, as measured from its center.

In the present invention, the refractive indices of the surface and central portions of the optical component's body are determined by the following procedure on the basis of the percent water contents of the corresponding sites.

[Method of Measuring the Refractive Indices of the Surface and Central Portions of the Optical Component's Body]

Provide more than one body of optical component of identical shape and leave them to stand in a more than 90% humid atmosphere at ordinary temperature for a specified time, say, 12 hours. Take the body out of the humid atmosphere and crack it after being frozen in liquid nitrogen. Pick up small measuring specimens with masses of about 1-20 mg from both the surface and central portions of each body and revert them to room temperature in a dry nitrogen atmosphere. Put the small specimens in a thermogravimetric analyzer (TGA) and determine the mass loss in a nitrogen atmosphere at 80-100° C. If the initial mass of the specimen as measured by TGA is written as W and its dry weight as $W_0$, the water absorbency of the specimen can be determined by the following formula:

$$\text{Water absorbency} = (W - W_0)/W_0 \times 100 \, (\%)$$

Figure 2:
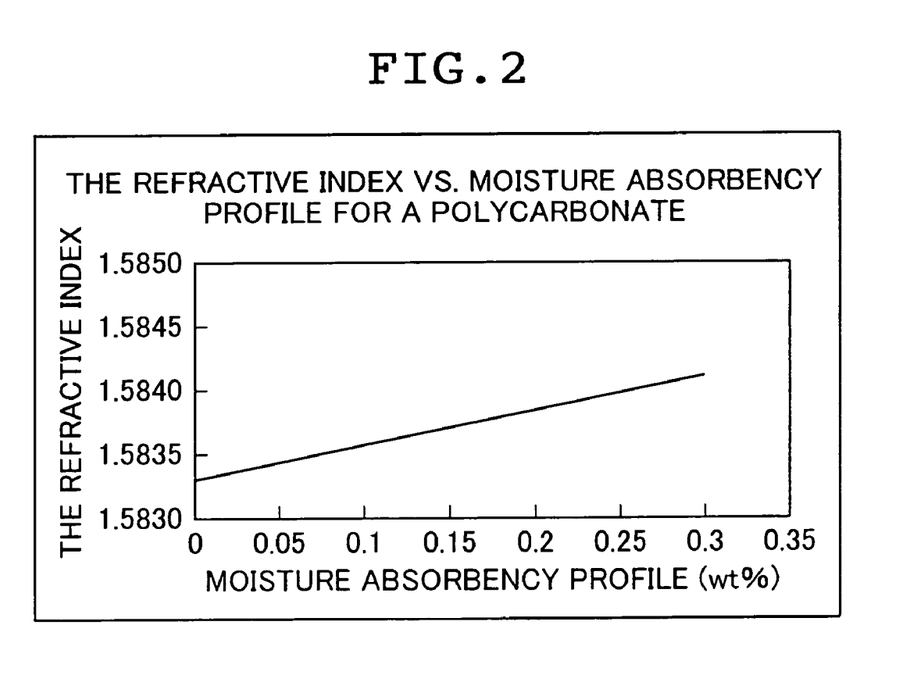
FIG. 2 is a graph showing the refractive index vs. moisture absorbency profile for a polycarbonate.

With a given temperature, the water absorbency of the plastic material the optical component's body is made of is known to be in proportion to its refractive index. FIG. 2 is a graph showing the refractive index vs. water absorbency profile at ordinary temperature (25° C.) for a polycarbonate resin which is a typical constituent material for the optical component's body.

Using this graph and the water absorbencies as determined by the above-described procedure, one can determine the refractive indices of the surface and central portions of the optical component's body.

The optical component of the invention has a moisture-proof coating formed at least on the surfaces of its body which are in contact with the outside air, whereby the differential refractive index during the transient period is held at no more than 0.0002.

If the differential refractive index during the transient period is no more than 0.0002, the interior of the optical component's body will not have an uneven profile of water absorbency should there be any moisture absorption by or moisture removal from the body on account of an environmental change and, hence, there will not be any uneven profile of refractive index that would otherwise occur within the body from uneven profile of water absorbency.

The optical component of the present invention preferably has a differential refractive index of no more than 0.0001 during the transient period.

The optical component of the present invention suffices to have a moisture-proof coating formed at least on the surfaces of its body which are in contact with the outside air and it is not essential that the moisture-proof coating be formed on all surfaces of the optical component's body as in the case shown in FIG. 1, where the optical component is indicated by 1 and its body by 10.

Figure 3:
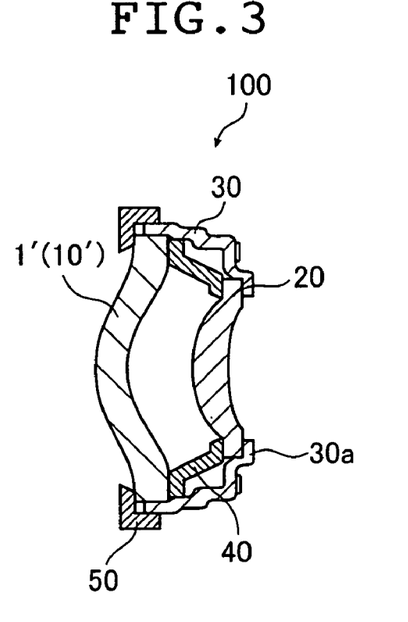
FIG. 3 is a diagrammatic section of an embodiment of the optical unit using the optical component of the invention (as it is cut through a plane including the optical axis)

FIG. 3 is a diagrammatic section of another embodiment of the optical component of the invention (as it is cut through a plane including the optical axis). The optical component in lens form of the invention which is generally indicated by 1' is assembled to make an optical unit 100. The optical unit 100 shown in FIG. 3 is a general optical unit setup for use in a lens mechanism in a silver photographic camera or in an imaging module in a digital camera, a video camera or a miniature camera that can be built into a cell phone. Stated briefly, the optical unit 100 shown in FIG. 3 comprises two lens elements 1' and 20 having different Abbe numbers that are assembled into a generally cylindrical lens barrel 30 and fixed in position by means of a lens clamp 50.

In addition, the optical unit 100 shown in FIG. 3 has a spacer 40 interposed between the lenses 1' and 20.

In the optical unit 100 of the present invention, lens 20 has a high Abbe number, specifically, between about 45 and 60.

The lens having such Abbe numbers is specifically exemplified by lenses made of glass or alicyclic polyolefins typified by ZEONEX™ manufactured by ZEON Corporation. These lens materials are generally known to have a very low saturated water absorbency not higher than 0.02% by mass. Lens 20 is made of such low-hygroscopicity lens material and does not need to have a moisture-proof coating formed on it.

On the other hand, lens 1' is the optical component 1' of the present invention and a plastic lens that has an Abbe number sufficient to correct chromatic aberration in combination with lens 20, specifically an Abbe number of from about 23 to about 35, may be used as the optical component's body 10'.

The setup of the optical unit 100 shown in FIG. 3 is described below more specifically. The lens barrel 30 consists of three cylindrical regions that have a common center but different diameters and which are arranged in the order of decreasing diameter along the optical axis of the optical unit 100. The smallest-diameter cylindrical region of the lens barrel 30 has an annular rib portion 30a formed on its end face to protrude inwardly. The inside of the rib portion 30a serves as an aperture through which incident light (e.g. taking light) is launched.

The smallest-diameter region of the lens barrel 30 is such that lens 20 can be assembled into it. In other words, the inside diameter of that region is generally equal to but slightly larger than the outside diameter of the lens 20. The largest-diameter portion of the lens barrel 30 is such that the optical component 1' of the invention can be assembled into it. In other words, the inside diameter of that region is generally equal to but slightly larger than the outside diameter of the optical component 1' of the invention.

Lens 20 is assembled into the smallest-diameter region of the lens barrel 30 on the side where the rib portion 30a protrudes (at the aperture through which incident light is launched), and the flange portion of the lens 20 is brought into contact with the rib portion 30a so as to determine the axial position of the lens 20. On the other hand, the optical component 1' of the invention is assembled into the largest-diameter region of the lens barrel 30.

The spacer 40 is a generally cylindrical member having at opposite ends those portions which contact the lens 20 and the optical component 1' of the invention; as already mentioned, the spacer 40 is inserted between the lens 20 and the optical component 1' of the invention within the lens barrel 30. By choosing the axial length of the spacer 40, the relative positions of the lens 20 and the optical component 1' of the invention in the axial direction can be determined properly.

In addition, the lens 20 and the optical component 1' of the invention, as well as the lens barrel 30 and the spacer 40 are all molded in such a way that when the lens 20 and the optical component 1' of the invention are properly assembled into the lens barrel 30, their optical axes are in alignment.

To construct the optical unit 100 shown in FIG. 3, the lens 20, spacer 40 and the optical component 1' of the invention are sequentially assembled into the lens barrel 30 and the optical component 1' of the invention is pressed toward the rib portion 30a by means of the lens clamp 50. The lens clamp 50 working in that way is fixed to the lens barrel 30 with an adhesive or by other means so that the optical unit 100 is fabricated.

Figure 4A:
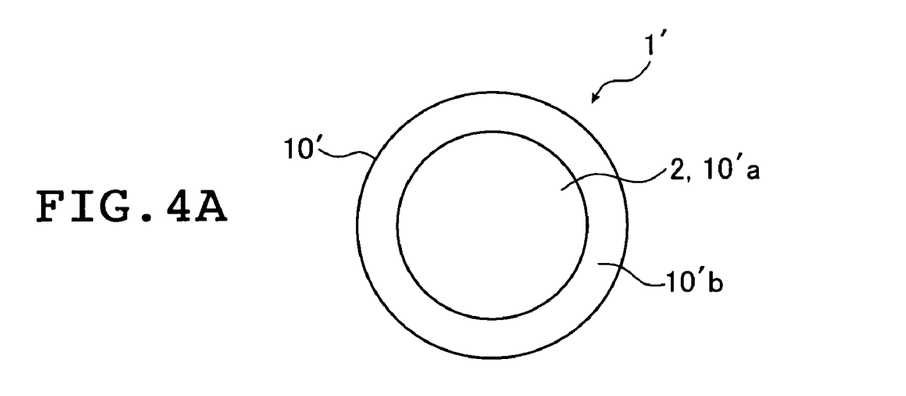
FIG. 4A is a front view of the optical component 1' (as it is seen in a direction parallel to the optical axis) and FIG. 4B is a section which is cut in the same direction as FIG. 3 is.
Figure 4B:
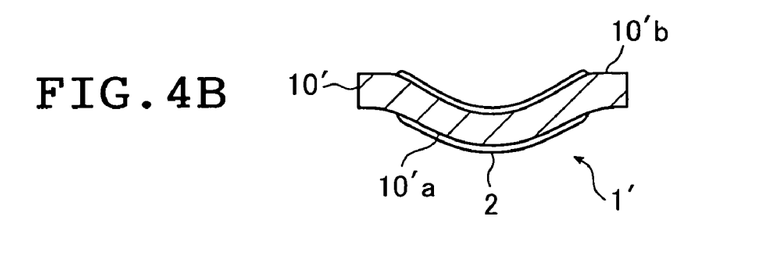

FIG. 4A is a front view of the optical component 1' of the present invention (as it is seen in a direction parallel to the optical axis) and FIG. 4B is a section which is cut in the same direction as FIG. 3 is. Like the optical component's body 10 shown in FIGS. 1A and 1B, the body 10' of the optical component 1' shown in FIGS. 4A and 4B is composed of a lens portion 10'a and a flange portion 10'b.

Further speaking of the optical unit 100 shown in FIG. 3, the optical component 1' of the invention has its flange portion held between the rib portion 30a of the lens barrel 30 and the spacer 40 and prevented from making contact with the outside air. Therefore, one may reasonably assume that the moisture absorption and moisture removal through the flange portion is negligible.

Accordingly, as FIG. 4B shows, the optical component 1' of the invention has a moisture-proof coating 2 formed only on the surfaces of the lens portion 10'a of its body 10' and the flange portion 10'b has no such moisture-proof coating 2. As long as the differential refractive index during the transient period is held no more than 0.0002, this construction is not only applicable but also preferred from the viewpoint of efficiency in the assembling of an optical unit.

Depending on the method of forming the moisture-proof coating, it can generally be said that in the case of the optical component's body 10' of the shape shown in FIGS. 4A and 4B, a uniform moisture-proof coating is more difficult to form in the flange portion 10'b than in the lens portion 10'a and the moisture-proof coating formed in the flange portion 10'b is more prone to become uneven in thickness. The flange portion 10'b is an area that permits the optical component 1' to have both axial alignment and registration in the axial direction after it has been set up to fabricate the optical unit 100. Therefore, if the moisture-proof coating formed in the flange portion 10'b become uneven in thickness, the axial alignment and registration in the axial direction become difficult, in addition, the optical performance of the optical unit 100 might be adversely affected.

Due to the difficulty involved in its formation, the moisture-proof coating formed in the flange portion 10'b of the optical component's body 10 may occasionally have poor adhesion. As the result, the moisture-proof coating might readily come off the flange portion 10'b to become a source of contamination during the use of the optical unit 100.

Further referring to the optical unit 100 having the setup shown in FIG. 3, if the inside of the lens barrel 30 is held airtight or if the opening in the lens barrel 30 is adapted to be so small that only a small volume of air will flow from the outside into the lens barrel 30, one may reasonably assume that the surface of the lens portion 10'a of the optical component's body 10' of the present invention which faces the interior of the lens barrel 30, namely, the concave face of that lens portion is subject to very small effects of moisture absorption and moisture removal. In a case like this, the moisture-proof coating 2 need not be formed on that concave face.

On the other hand, depending on the lens forming material used, the high Abbe number lens 20 may be subjected to the effects of moisture absorption and moisture removal. In a case like this, the lens 20 may be formed of the optical component of the present invention.

In order to form the moisture-proof coating only on those surfaces of the optical component's body 10' which are in contact with the outside air, namely, in the lens portion 10'a only as in the case of the optical component 1' shown in FIGS. 4A and 4B, the flange portion 10'b may be masked or held in position by a suitable means such as a holder while the moisture-proof coating is being formed by the procedure to be described later.

The optical component of the present invention will not have any uneven profile of refractive index in the interior of its body even if moisture absorption or moisture removal occurs due to an environmental change, so it is suitable for use as a plastic lens that is assembled to fabricate the optical unit 100 of the type shown in FIG. 3.

The present invention also provides an optical unit in which the above-described optical component of the invention has been assembled as a plastic lens. Stated more specifically, the present invention provides an optical unit comprising at least two lenses having different Abbe numbers, at least one of which is the plastic optical component of the present invention. Therefore, FIG. 3 is also a diagram that shows an embodiment of the optical unit of the present invention.

Note that the optical unit of the present invention is not limited in any particular way as long as it comprises at least two lenses having different Abbe numbers, at least one of them being the optical component of the present invention, and it may have a different setup than the optical unit 100 shown in FIG. 3. For example, in an optical unit for high-resolution applications, a plurality of imaging lenses, say, at least three of them are used in combination to achieve the desired resolving power and precision. The optical unit of the present invention may comprise such three or more lenses as long as at least one of them is the optical component of the invention.

If the optical unit of the present invention comprises three or more lenses, it is not necessary that all of them have different Abbe numbers. As long as it is optically designed such that at least two of the lenses in the optical unit have different Abbe numbers to correct chromatic aberration overall, two or more lenses having comparable Abbe numbers may be incorporated.

If the optical unit of the invention is to be used in a lens mechanism in a silver photographic camera or in an imaging module in a digital camera, a video camera or a miniature camera that can be built into a cell phone, it preferably has an auto-focus mechanism.

The plastic optical component of the present invention will not have an uneven profile of refractive index in its interior even if there occurs moisture absorption or moisture removal in response to an environmental change but the refractive index of the optical component taken as a whole varies gradually in response to the environmental change. Accordingly, an optical unit using this optical component undergoes a change in its optical characteristics in response to the environmental change. However, the change in refractive index is slow and uniform. In the case where the optical component itself which is a plastic lens undergoes a uniform change in refractive index and if the change is very small, not greater than what occurs due to moisture absorption, a substantial effect on the optical performance of the lens is no more than a change in its focal position and can be cancelled by using an auto-focus mechanism. Therefore, the optical unit of the present invention, if it is equipped with an auto-focus mechanism, has outstanding optical characteristics which will not be affected by environmental changes but can be fully exhibited at all times.

Various principles and control techniques are known to be used by the auto-focus mechanism in a lens mechanism in a silver photographic camera or in an imaging module in a digital camera, a video camera or a miniature camera that can be built into a cell phone. While various known auto-focus mechanisms may be employed by the optical unit of the invention, a preferred one is such that based on its image picked up through the optical unit, direct check of the subject is made to see whether it is in focus and if it is not, the proper focused condition is obtained by controlling the axial position of the lens or lenses in the optical unit.

Figure 5:
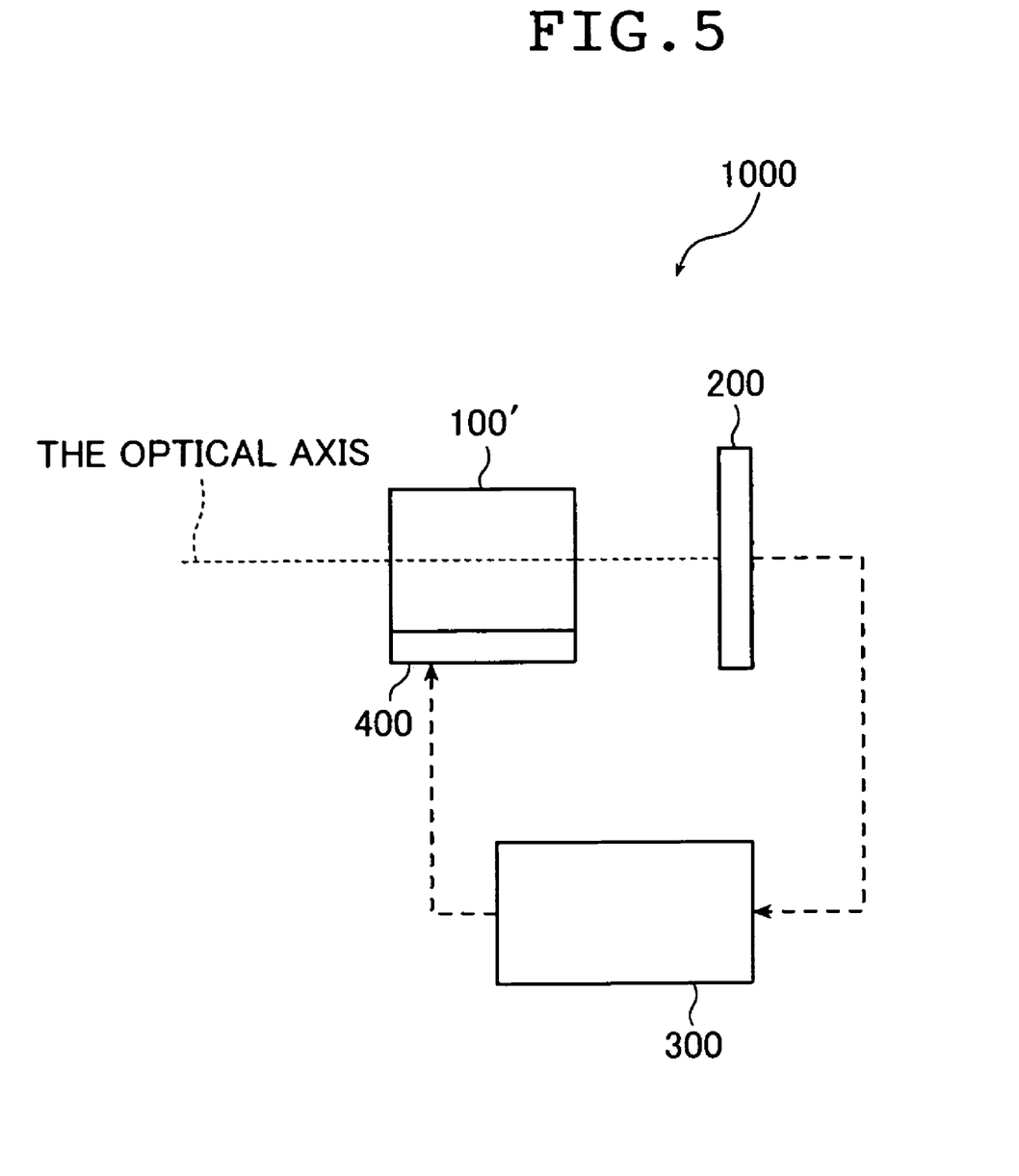
FIG. 5 shows in concept an exemplary layout of an imaging module using the optical unit of the present invention and an auto-focus mechanism.

FIG. 5 shows in concept an exemplary layout of an imaging module using the optical unit of the present invention and an auto-focus mechanism. It is a simplified view of the setup of a common digital camera. In the imaging module generally indicated by 1000 in FIG. 5, the optical unit 100' is the one of the present invention which comprises at least two lenses having different Abbe numbers, one of which is made of the optical component of the invention. The image passing through the optical unit 100' is picked up by a CCD image sensor 200. The optical image information picked up by the image sensor 200 is output as an electric signal and sent to an AF processing section 300. The AF processing section 300, based on the image information sent from the image sensor 200, checks the subject to see whether it is in focus and sends a drive signal to an actuator 400. The actuator 400, based on the drive signal from the AF processing section 300, moves all or some of the lenses in the optical unit 100' back and forth in the axial direction until the proper focused position is attained. A variety of means can be used as the actuator 400 and specific examples include a stepping motor, a linear motor, a piezoelectric device, an electroactive polymer (EAP), etc.

While the optical component of the present invention has been described above with the plastic lens for use in optical units being taken as an example, the optical component of the invention is by no means limited to the plastic lens and encompasses a wide range of known structures for plastic optical components. Hence, aside from the illustrated lens, the optical component of the invention may be chosen not only from among lenses having various other shapes and functions but also from among other known optical elements or components including prisms, optical filters, optical screens, deflectors, polarizers, light reflecting members, finders, glasses, contact lenses, reflectors and curved mirrors. It may also be chosen from among known optical elements or components that are used as assembled into imaging optical systems for use in imaging devices such as cameras (e.g., silver halide camera, digital camera and video camera), image forming apparatuses such as copiers and printers, and various other optical equipment including projectors, telescopes, binoculars and magnifiers.

There is also no limitation on the material the body of the optical component can be formed of and a variety of plastic materials (resin materials) used in known optical elements and ordinary optical components may be employed. To mention a few examples, methacrylic resins (e.g., PMMA), acrylic resins including alicyclic ones, polycarbonate resins, polyester resins including aromatic ones, polystyrene resins, acrylonitrile-styrene (AS) resins, alicyclic polyolefins, resins containing the tricyclodecane ring, cycloolefinic polymers, poly(methylpentene), styrene-butadiene copolymers, and polyesters having a fluorene group, may be employed.

The optical component of the present invention is characterized in that it will not have an uneven profile of water absorbency in its interior; considering this feature, among the plastic materials listed in the preceding paragraph, those which have comparatively high water absorbency, specifically a saturated water absorbency in excess of 0.02% by mass, are preferred and specific examples include methacrylic resins, acrylic resins including alicyclic ones, polycarbonate resins, polyester resins including aromatic ones, polystyrene resins, and alicyclic polyolefins. As already mentioned, there are alicyclic polyolefins that have a saturated water absorbency not higher than 0.02% by mass as exemplified by ZEONEX™; on the other hand, there are alicyclic polyolefins having a saturated water absorbency in excess of 0.02% by mass.

If the optical component of the present invention is to be used as the optical component 1' of the optical unit 100 shown in FIG. 3, its body preferably has an Abbe number sufficient to correct chromatic aberration in combination with lens 20 having high Abbe number, specifically an Abbe number of 45-60; it is specifically preferred that the optical component's body has an Abbe number of from about 23 to about 35. Suitable examples of materials having such Abbe number are polycarbonate resins and aromatic polyester resins.

The method of forming the body of the optical component also is not limited in any particular way and depending on the plastic material to be used, all known plastics molding techniques including injection molding, injection compression molding and compression molding may be adopted.

The shape and size (length, diameter and thickness) of the optical component's body also are not limited in any particular way and may be chosen as appropriate depending on the use of the optical component under consideration.

The moisture-proof coating is not limited in any particular way as long as the differential refractive index during the transient period is held not more than 0.0002 as the result of that coating being formed at least on the surfaces of the optical component which are in contact with the outside air. Therefore, it may be a single-layered or multi-layered film. In the case of a single-layered film, it may be an inorganic or an organic coating. In the case of a multi-layered film, it may solely be composed of inorganic coatings; alternatively, it may solely be composed of organic coatings. It may even be a composite film comprising an inorganic coating and an organic coating.

In the optical component of present invention, the inorganic coating which constitutes the single-layered film of the moisture-proof coating or which is employed as one of the layers in the moisture-proof coating or as part of the multi-layered composite film of moisture-proof coating is not limited in any particular way and a variety of thin films that are based on inorganic materials can be employed as long as they have sufficient transparency and show low or no moisture permeability.

Suitable inorganic materials include, for example, a silicon nitride such as $Si_3N_4$; a silicon oxynitride; silicon oxides represented by the formula $SiO_x$ ($0<x\leq2$), $ZrO_2$, a titanium oxide such as $TiO_2$, $TiO$ and $Ti_2O_3$; $Al_2O_3$, $Ta_2O_5$, $CeO_2$, $MgO$, $Y_2O_3$, $SnO_2$, $MgF_2$, $WO_3$, and a mixture consisting of an In/Sn mixed oxide.

If the moisture-proof coating is to be formed of these materials, it preferably has the densest possible structure and absorbs less of the intended wavelengths of light. In the case that an inorganic coating is used as the moisture-proof coating, a film consisting of a silicon nitride such as $Si_3N_4$, a film consisting of a silicon oxynitride and a vitreous film consisting of silicon oxides is preferred. Hence, in the case that an inorganic coating is used as a single-layered film, or a part of multi-layered film or multi-layered composite film, a film consisting of a silicon nitride such as $Si_3N_4$, a film consisting of a silicon oxynitride, and a vitreous film consisting of silicon oxides are particularly preferred as an inorganic coating.

If an inorganic coating is to be used as the moisture-proof coating, its thickness is not limited to any particular value as long as the differential refractive index during the transient period is held not more than 0.0002 as the result of it being formed at least on the surfaces of the optical component which are in contact with the outside air. The thickness may be set at an appropriate value that can assure the required transparency and which can exhibit the desired moisture barrier quality in accordance with the composition of the inorganic coating or depending upon whether it is employed as a single-layered film or as a multi-layered film or whether it is combined with an organic coating to make a multi-layered composite film.

If the inorganic coating is to be used as a moisture-proof coating, its thickness preferably ranges from 10 nm to 1,000 nm (1 μm). These values particularly refer to the total thickness of the inorganic coating which constitutes a single-layered film or a multi-layered film; alternatively, they refer to the total thickness of all inorganic coatings in a multi-layered composite film with organic coating. If the thickness of the inorganic coating is within the stated range, there will be only a few pinholes that affect the moisture barrier quality. To state more specifically, the reason for limiting the thickness of the inorganic coating such that it lies within the stated range is as follows: at thicknesses smaller than 10 nm, pinholes may potentially occur and at thicknesses greater than 1,000 nm, the moisture-proof coating makes no further contribution to the purpose of moisture prevention; on the contrary, an increased thickness will lower the production rate, particularly in the case of dry film formation, and residual stress will increase the chance of cracking.

The method of forming the inorganic coating is not limited in any particular way and one can employ a variety of dry processes such as vacuum evaporation, sputtering, ion plating and CVD (chemical vapor deposition), as well as a variety of wet processes including the sol-gel method. A suitable method may be chosen as appropriate for the composition of the inorganic coating to be formed, its thickness, and other factors. It is particularly preferred that the thickness of the inorganic coating to be formed by dry processes is within the above-mentioned range of 10 nm to 1 μm since the reasons already given for the criticality of that range hold true with greater validity.

There is also no limitation on the method of applying solutions when one employs wet processes such as the sol-gel method and a variety of coating methods can be used, including dip coating, spray coating and spin coating. For advantages such as the easiness of applying solutions on the surface of the optical component's body, where it is required to form a moisture-proof coating, namely the capability of forming the inorganic coating, the dip coating may be mentioned as a preferred example.

If the sol-gel method is adopted, the inorganic coating can be formed by, for example, hydrolyzing alkoxysilane compounds. Alternatively, commercial products may be employed and an example is SolGard™ manufactured by Nippon Dacro Shamrock Co., Ltd.

In the optical component of present invention, the organic coating which constitutes the single-layered film of the moisture-proof coating or which is employed as one of the layers in the moisture-proof coating or as part of the multi-layered composite film of moisture-proof coating is not limited in any particular way and a variety of thin films that are based on organic materials can be employed as long as they have sufficient transparency and show low or no moisture permeability.

Suitable organic coatings include, for example, coatings based on poly(vinylidene chloride) and vinylidene chloride/vinyl chloride copolymer, coatings based on alicyclic polyolefin resins such as ZEONEX™ manufactured by ZEON Corporation, coatings based on amorphous fluoropolymers such as CYTOP™ manufactured by Asahi Glass Co., Ltd. and Teflon (registered trademark) AF manufactured by DuPont, coatings based on fluoropolymers such as Novec™ manufactured by Sumito 3M Limited, and coatings based on silicone resins such as Shin-Etsu Silicone KR251, KR400 and KR114A of Shin-Etsu Chemical Co., Ltd. Among these, the coatings based on poly(vinylidene chloride) and vinylidene chloride/vinyl chloride copolymer are preferred.

Here, in the case of employing an organic coating as the moisture-proof coating, it is preferably a coating based on vinylidene chloride. Stated more specifically, if an organic coating constitutes the single-layered film of the moisture-proof coating or if it is employed as one of the layers in the moisture-proof coating or as part of the multi-layered composite coating, a coating based on vinylidene chloride is particularly preferred.

If an organic coating is to be used as the moisture-proof coating, its thickness is not limited to any particular value as long as the differential refractive index during the transient period is held not more than 0.0002 as the result of it being formed at least on the surfaces of the optical component which are in contact with the outside air. The thickness may be set at an appropriate value that can assure the required transparency and which can exhibit the desired moisture barrier quality in accordance with the composition of the organic coating or depending upon whether it is employed as a single-layered film or as a multi-layered film or whether it is combined with an inorganic coating to make a multi-layered composite film.

If the organic coating is to be used as a moisture-proof coating, its thickness preferably ranges from 100 nm to 10,000 nm (10 μm). These values particularly refer to the total thickness of the organic coating which constitutes a single-layered film or a multi-layered film; alternatively, they refer to the total thickness of all organic coatings in a multi-layered composite film with inorganic coating. If the thickness of the organic coating is within the stated range, the organic coating is superior in the moisture barrier quality and the optical performance. Compared with the inorganic coating on the condition that the thickness of the coating is same, the organic coating is inferior to the inorganic coating in the moisture barrier quality. Hence, if the thickness of the organic coating is smaller than 100 nm, it might not able to obtain desired moisture barrier quality. Further, at thicknesses smaller than 100 nm, there is an increased chance for the occurrence of pinholes and at thicknesses greater than 10 μm, the organic coating makes no further contribution to the purpose of moisture prevention; on the contrary, an extremely thick film tends to lose thickness uniformity, leading to reduced optical performance.

It should further be mentioned that the organic coating preferably has good transmission of light rays and low refractive index as its optical characteristics. Low refractive index results in low loss due to surface reflection of incident light, eventually leading to better transmittance of light rays. The organic coating may also be adapted to have additional features such as anti-reflection and hard coat.

The method of forming the organic coating is not limited in any particular way and one can employ a variety of wet processes such as a method comprising the steps of preparing a coating solution having the film forming resin component dissolved or dispersed therein, applying the coating solution and drying the applied film (organic coating), as well as a variety of dry processes such as plasma polymerization and CVD. A suitable method may be chosen as appropriate for the composition of the organic coating to be formed, its thickness, and other factors.

In the case of wet processes which employ coating solutions, there is no limitation on the method of applying coating solutions and a variety of methods can be employed, including spray coating, brush coating and dip coating. For advantages such as the easiness of applying coating solutions on the surface of the optical component's body, where it is required to form a moisture-proof coating, namely the capability of forming the organic coating, the dip coating may be mentioned as a preferred example.

In particular, in the case of forming the organic coating by applying coating solutions, its thickness is more preferably within the above-mentioned range of 100 nm to 10 μm since the reasons already given for the criticality of that range hold true with greater validity.

If a composite coating consisting of an inorganic coating and an organic coating is used as the moisture-proof coating of the present invention, the surface of a previously formed inorganic coating may optionally be treated, as by application of an anchor coat, in order to enhance its adhesion to a subsequently formed organic coating.

If the moisture-proof coating is an inorganic coating either used solely or combined with an organic coating to make a composite coating, a transparent primer coat having softer physical properties may be provided in order to prevent cracking of the moisture-proof coating. Transparent primer coats that may be provided to this end include silicon oxide films represented by the formula $SiO_x$ (0<x<2), a film consisting of a silicon nitride such as $Si_3N_4$, a film consisting of a silicon oxynitride and films based on the organic materials listed previously as materials for making the organic coating.

In the optical component of the present invention, the thickness of the moisture-proof coating, namely, the thickness of the inorganic coating and/or organic coating which constitutes the moisture-proof coating is most preferably uniform throughout. However, the present invention is by no means limited to this particular case as long as the differential refractive index during the transient period is held not more than 0.0002 as the result of the moisture-proof coating being formed at least on the surfaces of the optical component which are in contact with the outside air.

Take, for example, the optical component 1 shown in FIGS. 1A and 1B. It basically suffices that only the optically acting region such as the lens portion 10a of the optical component's body 10 has a predetermined thickness of the moisture-proof coating that is appropriate for particular optical characteristics and one may adopt other designs such as where the moisture-proof coating in edge and end regions such as the flange portion 10b which are not responsible for the transmission of light rays is thicker or thinner than in the other regions. In particular, if the moisture-proof coating is to be formed on all surfaces of the body of an optical component such as the optical component 1' used in the optical unit shown in FIG. 3 which has the flange portion that is not in contact with the outside air, the moisture-proof coating on the surfaces of the flange portion may be thinner than the moisture-proof coating on the surfaces of the lens portion.

Even the thickness of the moisture-proof coating in the optically acting region such as the lens portion need not necessarily be uniform and it may have a certain amount of thickness profile as long as it is appropriate for the required optical characteristics.

In the present invention, the moisture-proof coating will develop particularly superior moisture barrier quality if it has a multi-layered composite coating employing an inorganic coating and an organic coating in combination. While the reason for this is not clear, it may be theorized that an inorganic coating and an organic coating, which are applied or formed by different mechanisms from different compositions, cooperate to make up or compensate for the defects the other coating has and, at the same time, the moisture resisting properties of the respective coatings develop synergistically to exhibit outstanding moisture resistance.

In general, inorganic coatings are hard and involve lots of pinholes, cracks and other defects; on the other hand, organic coatings have a certain degree of elasticity. Therefore, when employing a multi-layered composite coating as the moisture-proof coating, one may provide an inorganic coating in the lower layer and an organic coating in the upper layer; by so doing, the pinholes and other defects in the inorganic coating are effectively filled by the organic coating to eventually form a defect-free coating, thereby developing extremely high moisture barrier quality making the most of the inherently high moisture barrier quality of the inorganic coating. In addition, the elastic organic coating works as a protective film that protects the inorganic coating from external stress or against thermal or otherwise induced expansion/contraction of the optical component's body; consequently, the strength of the moisture-proof coating is sufficiently assured that it exhibits satisfactory moisture resisting property over an extended period of time.

While the plastic optical component of the present invention has been described above in detail with reference to particular embodiments, the present invention is by no means limited to those particular embodiments and it should be noted that various improvements and modifications are of course possible without departing from the scope and spirit of the invention.

For instance, in the illustrated optical components, the moisture-proof coating is directly formed on surfaces of the optical component's body but this is not the sole case of the invention and an intermediate coat such as an index adjusting coat, an anti-reflection coat or an adhesion enhancing coat may be provided between the optical component's body and the moisture-proof coating. If desired, the moisture-proof coating may be covered with an overcoat such as an anti-reflection coat, an index adjusting coat, an adhesion enhancing coat or a damage preventing barrier film. In short, as long as at least the surfaces of its body which are in contact with the outside air are covered with the moisture-proof coating, the plastic optical component of the present invention may employ a variety of films or coats.

On the following pages, the plastic optical component of the invention is described in further detail by means of specific examples.

In order to evaluate the optical performance of the plastic optical component of the invention, optical unit 100 shown in FIG. 3 was employed. In the optical unit 100 shown in FIG. 3, lens 20 was a glass lens having an Abbe number of 56 (the radius of the lens portion was 6.4 mm on the entrance face and 4.9 mm on the exit face; average thickness was 2.9 mm); the optical component's body 10' was a lens made of polycarbonate resin having an Abbe number of 30 (the radius of the lens portion 10' was 9.0 mm on the entrance face and 7.5 mm on the exit face; average thickness was 2.5 mm).

The resolving power of the optical (lens) unit 100 was measured after it was left in a 30% humid environment at 25° C. for one week; the MTF (modulation transfer function) at 50% contrast was 30 lines/mm at the center of the axis and 25 lines/mm in the periphery on the average.

EXAMPLE 1

In this example, like the optical component 1 shown in FIG. 1, a moisture-proof coating 2 was formed on all surfaces of a lens (optical component's body) 10 made of polycarbonate resin. The moisture-proof coating 2 was a silicon oxide film deposited in a thickness of about 100 nm by sputtering. The sputter target was a silicon plate. During sputtering, Ar was introduced at the time the pressure reached $7 \times 10^{-4}$ Pa and electric discharge was performed at 0.3 Pa for 5 minutes to effect plasma treatment on the surfaces of the lens 10. Subsequently, the Si target was pre-sputtered for 3 minutes. Thereafter, the discharge power was increased 4-fold and with $O_2$ being introduced as a reactive gas, the lens 10 was subjected to deposition treatment at 0.3 Pa until a clear moisture-proof coating 2 formed in a thickness of 100 nm. The thus obtained optical component's body 10 was used as sample 1.

[Method of Measuring the Refractive Indices of the Surface and Central Portions of the Optical Component]

By repeating the above-described procedure, sample 1 was prepared in more than one unit and left to stand in a more than 90% humid atmosphere at ordinary temperature for 12 hours. Sample 1 was taken out of the humid atmosphere and cracked after being frozen in liquid nitrogen. From the sample, two small measuring specimens, one representing its surface portion and the other representing the central portion, were taken. The specimen representing the surface portion was taken from within about 0.5 mm of the surface of the lens portion 10a of the lens (optical component's body) 10, and the specimen representing the central portion was taken from within about 0.5 mm of the center of the lens (optical component's body) 10. The sample had been colored in those portions so that they could be readily identified. The collected specimens were reverted to room temperature in a dry nitrogen atmosphere. The specimens were then put in a thermogravimetric analyzer (TGA) and the mass loss was determined in a nitrogen atmosphere at 80-100° C. The water absorbency of each specimen was determined by the following formula:

Water absorbency=$(W-W_0)/W_0 \times 100$ (%)

where W is the initial mass as measured by TGA and $W_0$ is its dry weight.

The following are the actual data for W and $W_0$ and the water absorbency calculated:

Surface portion: W=10.132 mg; $W_0$=10.122 mg; water absorbency=0.1%

Central portion: W=8.546 mg; $W_0$=8.538 mg; water absorbency=0.09%

In the next step, the water absorbency data were plotted on the graph shown in FIG. 2 to determine the refractive indices of the surface and central portions of sample 1 at ordinary temperature. The results were as follows:

Refractive index of the surface portion=1.5836

Refractive index of the central portion=1.5835

From these results, it was confirmed that the differential refractive index between the surface and central portions of sample 1 was 0.0001.

[Evaluation of Optical Performance]

Sample 1 as prepared by the above-described procedure was thoroughly dried in a desiccator at 50° C. for 7 days and thereafter assembled as an optical component 1' to make an optical unit 100 shown in FIG. 3. Similarly, a glass lens was assembled as a lens 20 to make the optical unit 100. Subsequently, the individual lenses were finely adjusted in both orientation and lens-to-lens distance to have specified values of resolving power. The optical unit 100 was then left to stand in a 30% humid environment at 25° C. for a week and thereafter placed under conditions of 90% RH and 25° C. to measure time-dependent changes in the resolving power. Using an MTF meter of TRIOPTICS GmbH, resolving power was measured as MTF at 50% contrast. The peripheral resolving power was expressed by MTF as averaged for tangential and sagittal directions. The results of the resolving power measurements are shown in Table 1.

EXAMPLE 2

By repeating the procedure of Example 1 except that the flange portion 10b was masked during sputtering, a silicon oxide layer was deposited in a thickness of 100 nm to form a moisture-proof coating 2 on all surfaces of the polycarbonate lens (optical component's body) 10 excepting the flange portion 10b. The product thus obtained was designated sample 2. This sample was assembled as an optical component 1' to make the optical unit 100 shown in FIG. 3 and its optical performance was evaluated. The results are also shown in Table 1.

EXAMPLE 3

In this example, a moisture-proof coating 2 was formed by coating all surfaces of a polycarbonate lens (optical component's body) 10 with a vinylidene chloride layer in a thickness of 8 μm. The actual procedure employed was as follows: to all surfaces of the lens, an undercoating agent (WS-5000; product of Mitsui Takeda Chemicals, Inc.) was applied and dried at 80° C. for 30 minutes; subsequently, a vinylidene chloride latex (L551B; product of ASAHI KASEI CORP.) was applied and dried at 110° C. for 30 minutes; thereafter, the substrate was left to stand at 35° C. for 2 days until a clear moisture-proof coating 2 formed in a thickness of 8 μm. The product thus obtained was designated sample 3. The "thickness" as used herein means the overall thickness including the undercoat.

For sample 3 thus obtained, the refractive indices of the surface and central portions of the optical component were measured as in Example 1. The following are the actual data for W and $W_0$ of the measuring specimens taken from the surface and central portions of the sample, as well as their water absorbencies and refractive indices:

Surface portion: W=11.427 mg; $W_0$=11.420 mg; water absorbency=0.06%

Central portion: W=10.683 mg; $W_0$=10.676 mg; water absorbency=0.06%

Refractive index of the surface portion=1.5834

Refractive index of the central portion=1.5834

From these data, it was confirmed that the differential refractive index between the surface and central portions of sample 3 was zero.

Sample 3 was assembled as an optical component 1' to make an optical unit 100 shown in FIG. 3 and its optical performance was evaluated as in Example 1. The results are also shown in Table 1.

COMPARATIVE EXAMPLE

A polycarbonate lens having no moisture-proof coating formed on its surfaces was used as an optical component and the refractive indices of its surface and central portions were measured as in Example 1. The following are the actual data for W and $W_0$ of the measuring specimens taken from the surface and central portions of the sample, as well as their water absorbencies and refractive indices:

Surface portion: W=10.755 mg; $W_0$=10.730 mg; water absorbency=0.23%

Central portion: W=9.548 mg; W$_0$=9.538 mg; water absorbency=0.10%

Refractive index of the surface portion=1.5839

Refractive index of the central portion=1.5836

From these data on the comparative lens having no moisture-proof coating formed on its surfaces, it was confirmed that the differential refractive index between the surface and central portions of the lens was greater than 0.0002.

The comparative polycarbonate lens was assembled as an optical component 1' to make an optical unit 100 and its optical performance was evaluated as in Example 1. The results are also shown in Table 1.

TABLE 1

|  |  | Humidifying time (hr) | | | |
| --- | --- | --- | --- | --- | --- |
|  | Resolving power | 0 | 12 | 24 | 36 |
| Example 1 | Center | 30 | 30 | 29 | 30 |
|  | Peripheral | 25 | 24 | 25 | 25 |
| Example 2 | Center | 30 | 30 | 30 | 30 |
|  | Peripheral | 25 | 25 | 24 | 25 |
| Example 3 | Center | 30 | 29 | 30 | 30 |
|  | Peripheral | 25 | 25 | 25 | 25 |
| Comparative | Center | 30 | 25 | 29 | 30 |
| Example 1 | Peripheral | 25 | 21 | 23 | 25 |

As is clear from Table 1, the optical units of Examples 1-3 suffered only minimal changes, or drops, in both the central and peripheral resolving powers with the lapse of time from the start of resolving power measurement.

On the other hand, the central and peripheral resolving powers of the comparative optical unit returned to the initial levels 36 hours after the start of resolving power measurement; however, after 12 and 24 hours of the measurement, both the central and peripheral resolving powers of the optical unit experienced noticeable drops.

What is claimed is:

1. A plastic optical component which has a moisture-proof coating formed at least on the surfaces in contact with the outside air and wherein during the transient period from the time when the water absorbencies of the surface and central portions of the component began to change on account of an environmental change until the time when they reach the saturated water absorbencies, the difference between the refractive indices of the surface and central portions of the component is no more than 0.0002.

2. An optical unit comprising at least two lenses having different Abbe numbers, at least one of which is the plastic optical component according to claim 1.

3. The optical unit according to claim 2, wherein the optical unit has an auto-focus mechanism.

* * * * *